United States Patent
Biebach (10) Patent No.: US 6,831,845 B2
(45) Date of Patent: Dec. 14, 2004

(54) HIGH-VOLTAGE TRANSFORMER

(75) Inventor: Jens Biebach, Gauting (DE)

(73) Assignee: Magnet-Motor Gesellschaft fur Magnetmotorische Technik mbH, Starnberg (DE)

( * ) Notice: Subject to any disclaimer, the term of this patent is extended or adjusted under 35 U.S.C. 154(b) by 0 days.

(21) Appl. No.: 10/168,339

(22) PCT Filed: Dec. 18, 2000

(86) PCT No.: PCT/EP00/12907

§ 371 (c)(1),
(2), (4) Date: Jun. 20, 2002

(87) PCT Pub. No.: WO01/47097

PCT Pub. Date: Jun. 28, 2001

(65) Prior Publication Data

US 2003/0058660 A1 Mar. 27, 2003

(30) Foreign Application Priority Data

Dec. 20, 1999 (DE) .......................... 199 61 541

(51) Int. Cl.[7] .............................................. H02M 3/335
(52) U.S. Cl. .............................. 363/16; 363/60; 363/71
(58) Field of Search .............................. 363/16, 60, 61, 363/65, 67, 71, 125, 131; 336/170, 175, 185, 211

(56) References Cited

U.S. PATENT DOCUMENTS

| 3,639,788 | A | * | 2/1972 | Horan | 310/319 |
| 4,191,994 | A | * | 3/1980 | Kratz et al. | 363/135 |
| 4,654,770 | A | * | 3/1987 | Santurtun et al. | 363/17 |
| 4,761,804 | A | * | 8/1988 | Yahata | 378/109 |
| 4,779,182 | A | * | 10/1988 | Mickal et al. | 96/82 |
| 5,023,768 | A | * | 6/1991 | Collier | 363/68 |
| 5,121,317 | A | * | 6/1992 | Vogler | 363/96 |
| 5,594,322 | A | * | 1/1997 | Rozman et al. | 322/10 |
| 5,737,197 | A | * | 4/1998 | Krichtafovitch et al. | 363/17 |
| 5,923,549 | A | * | 7/1999 | Kobayashi et al. | 363/65 |

FOREIGN PATENT DOCUMENTS

| DE | 19816748 A1 | 10/1999 |
| EP | 0154052 B1 | 6/1988 |

* cited by examiner

*Primary Examiner*—Adolf Berhane
(74) *Attorney, Agent, or Firm*—Venable LLP; Robert Kinberg (57) ABSTRACT

The invention relates to a high-voltage transformer arrangement which converts to the direct current voltage from a direct current voltage source (2) into a direct current voltage output signal ($V_{out}$), using a current inverter (4) and a transformer (8) to an output rectifier (12), which is connected downstream, and a filter (14). The transformer (8) has a transformer core comprising several interruption points in the magnetic path, at which insulator sections are located. The individual core sections are controlled by potential. The separate transformer core sections together with their corresponding windings form a primary system and a secondary system, which is separated from said primary system both spatially and in terms of potential, having a relatively high stray inductance. Said stray inductance may be used in conjunction with other components for the resonant mode of the high-voltage transformer during the switching operations (quasi-resonant mode) and for adjusting an approximately sinusoidal transformer current during the current inverter clock cycle. At the same time, the spatial separation simplifies the insulation of the transformer parts.

28 Claims, 6 Drawing Sheets

HIGH-VOLTAGE TRANSFORMER

The invention relates to a high-voltage transformer arrangement for converting a first, relatively low direct voltage supplied by a direct-voltage source to a second, relatively high direct voltage. A high-voltage transformer arrangement of this type can be used, for example, for charging a capacitor with high capacitance over a short period of time.

Different designs are known for high-voltage transformer arrangements. The essential elements of a high-voltage transformer arrangement involve a current inverter connected to the direct current source and generally formed by an arrangement of power-electronic switches, a transformer with primary coil and secondary coil on a transformer core, a switch control for triggering the current inverter, an output rectifier that is connected to the secondary coil of the transformer and a filter connected to the output rectifier.

For nearly all applications of a high-voltage transformer arrangement of this type, the most compact transformer design possible is normally desired. The size of the transformer above all is critical for the structural volume of the high-voltage transformer arrangement. Essential elements for dimensioning a transformer designed for a high-voltage operation are the required insulation between the transformer components, namely the primary coil or coils, the transformer core and the secondary coil or coils.

When viewing a traditional transformer, for example, where a voltage of 40 kv develops against ground on the secondary side, an insulation designed for 40 kv must be provided between the location of the secondary coil where the 40 kV voltage appears and the adjacent location, which has ground or mass potential, e.g. the transformer coil that is connected to ground potential. As a result, narrow limits are set for a compact geometric dimensioning of the transformer.

It is the object of the invention to provide a high-voltage transformer arrangement for which the transformer design can be simplified considerably as compared to known high-voltage transformer arrangements.

This object is solved according to the invention for this high-voltage transformer arrangement in that the transformer core is provided with several interruption points on the magnetic path, in which insulation sections are located, and in that the transformer core sections formed by the interruptions, which are preferably controlled by potential, together with associated coils or coil sections of primary and secondary coils, form separate primary and secondary systems that are separated with respect to potential.

The creation of several "interruption points" in the transformer core creates two insulated sections of the transformer core that are completely separate with respect to potential. The term "several" means that at least two interruptions are necessary in order to create two sections that are separate with respect to potential.

The separation of the transformer core into several sections is accompanied by a complete spatial separation of the transformer into a primary system and a secondary system. This spatial separation makes it easier to insulate the area between the primary coil and the corresponding core sections or the secondary coil and the corresponding core sections. Separating the transformer according to the invention into primary and secondary systems that are insulated against each other results in an increase in the stray inductance with simultaneous tapping of the main inductance. This effect, which may not be favorable per se, can be utilized for optimizing the high-voltage transformer arrangement operation with a corresponding design for the current inverter connected to the primary system or the output rectifier connected to the secondary system.

The high-voltage transformer arrangement according to the invention can be used in power supplies with a direct-current voltage intermediate circuit.

For one special embodiment of the invention, a continuous insulator is arranged between primary system and secondary system. Starting with this basic measure, the primary systems of a plurality of transformers can subsequently be combined, in particular inside a joint housing, which then contains the transformer core sections for the individual transformers and the associated primary coils. The secondary system can be treated in the same way. The primary systems and the secondary systems can be disposed in separate housings or in a joint housing. The use of a suitable arrangement or external wiring makes it possible to control the individual sections of the transformer core or cores with respect to potential, such that the lowest maximum potential differences result between the potentials of respectively one coil and the potential of the core section assigned to this coil. The insulator disposed between the core sections must then insulate the different potentials of the core sections against each other. For this, individual core sections of the transformers can be interconnected with specific switching components (of the current inverter(s) or the output rectifier(s)), such that the interfering emission from the high-voltage transformer arrangement is minimized.

It is particularly advantageous if the energy in the inventive high-voltage transformer arrangement of a special embodiment is transmitted without intermediate storage in the transformer and based on the flux converter principle from the primary system to the secondary system. A storage choke coil with thereto-connected output capacitor is preferably connected downstream of the output rectifier. A storage choke coil can also be provided in each output branch of the output rectifier to reduce the voltage stress for the single choke coil.

Comments relating to special, advantageous embodiments of the invention are provided in the following, wherein these embodiments can be used separately or in any combination considered useful or obvious to the person skilled in the art.

The inventive concept of separating the transformer core into several sections, electrically insulating these sections and the associated creation of a primary system and a secondary system make it possible to have a variety of high-voltage transformer arrangement designs. One or several primary coils or primary coil sections can be assigned in the known manner to a transformer. In the same way, one or several secondary coils or secondary coil sections can also exist. The high-voltage transformer arrangement can be provided with one or several individual transformers.

In principle, the primary coils of several transformers can be parallel connected, wherein these primary coils are then supplied by the same direct-current source via a joint current inverter. However, the primary coils of each transformer can also be triggered separately with a separate current inverter. In addition, the primary coils can be connected in series.

The secondary coils of several transformers in the secondary system can be connected in series, wherein each secondary coil is assigned a separate output rectifier that has a separate output filter or is connected to a joint one. Also possible is a series connection of the secondary coils of the high-voltage transformer arrangement, which is then connected to a joint output rectifier.

In the following, several circuit variants for connecting the primary system or systems of a special embodiment of the high-voltage transformer arrangement are explained.

The transformer or the interconnected transformers are advantageously connected on the primary side with one terminal to the center tap of a half bridge, consisting of power-electronic switches that do not block in return direction, and with the other terminal to a capacitor.

The transformer of an alternative embodiment is connected on the primary side with each terminal to a center terminal of a[1] consisting of power-electronic switches, which do not block in return direction. The power-electronic switches in particular comprise transistors. These transistors either comprise a hybrid integrated or parasitic diode, or the diode is antiparallel connected as discrete component. It is known that power transistors of this type are encumbered with parasitic capacitances. The above-mentioned increased stray inductance of the transformer in the high-voltage generator[2] according to the invention preferably can be attuned to the parasitic capacitances of the switching transistors, so as to result in a resonant operation for the switching operations of the current inverter. If necessary, the capacitance must be increased with a discrete capacitor. The switching losses can be reduced considerably with a resonant operation of this type and the electromagnetic compatibility of the circuit can be improved. By attuning the stray inductance of the transformer to the parasitic capacitances of the switching transformer, it is possible to trigger a complete recharge of parallel capacitances prior to the closing of the transistor, which must take over the current, thereby minimizing the switching losses.

[1]Note: This sentence is incomplete in the original.
[2]Note: "Hochspannungswandler [high-voltage transformer]" is used iln all other instances in place of "hochspannungsgenerator [high-voltage generator]."

Preferably measures are taken in the secondary system of the transformer for the high-voltage transformer arrangement according to the invention to ensure the voltage sustaining capability of the output rectifier. For that purpose, several diodes are connected in series, if necessary, in each branch of the respective output rectifier. In particular, respectively one capacitance and one resistance are parallel connected for each individual diode of the output rectifier. As a result, the diodes are dynamically and statically balanced with respect to the voltage to be blocked. These capacitors, which are parallel-connected to the diodes in the output rectifier, are preferably attuned to the stray inductance of the transformer, so as to form a series resonance circuit with a characteristic frequency that is somewhat lower than the switching frequency of the high-voltage transformer arrangement predetermined by the switch control.

As mentioned in the above, the separation according to the invention of the transformer into a primary system and a secondary system, insulated against the primary system, results in an increase in the stray inductance, which can be used advantageously. At the same time, the main inductance of the transformer is reduced. If this reduction in the main inductance is high enough to prevent achieving the desired operational behavior of the high-voltage transformer arrangement, it is possible according to one preferred embodiment of the invention to parallel-connect or series-connect the primary coils of a transformer for a high-voltage transformer arrangement containing several primary coils, wherein these primary coils can include one or several secondary coils. This so-called nesting results in an increase in the main inductance of the transformer.

In accordance with the above measure, one special embodiment of the high-voltage transformer arrangement has several secondary coils that are connected parallel or in series, wherein one or several primary coils are also included. For this, the coils of the secondary system can also be conducted out either individually or with a joint tap, so that several secondary voltages—even completely insulated secondary voltages—are made available.

As a result of the inventive separation of the transformer in a high-voltage transformer arrangement with an insulator or individual insulator sections inserted between primary system and secondary system, it is possible to meet relevant regulations for insulation design with reduced technical expenditure.

Insulating systems that are known per se can be expanded by the insulator sections between primary system and secondary system in the high-voltage transformer arrangement according to the invention. In particular, the thickness, expansion and edge shape of the interruptions in the transformer core can be designed in dependence on the required voltage sustaining capability between primary-side and secondary-side core sections of the transformer and the transformer coils.

The insulator sections in particular can consist of several different materials. The material combinations are selected so as to ensure on the one hand the required insulating characteristics and, on the other hand, take over special mechanical functions.

Specifically, the idea is to design the insulator sections of the transformer so as to form components of a housing that encloses the primary system and/or the secondary system. Thus, the switching components can be sealed hermetically against each other if necessary. In that housing, the insulator separating the primary system from the secondary system can form the container wall. The primary-side and the secondary-side regions of the housing, which are separated by a wall, can be filled separately with gas, a liquid, a powder or the like to improve, for example, the cooling and/or insulation of the switching components in these regions of the housing.

It is particularly advantageous if the switch is controlled with a phase-locked loop. The first input of this loop is supplied with a current detector signal, derived from the chronological course of the primary transformer current, while the second input is supplied with the output signal from the phase-locked loop is supplied via a delay element. For this, the power-electronic switches are triggered with the output signal and the complementary output signal from the phase-locked loop.

The phase-locked loop consists in a manner known per se of a phase detector or phase comparator, a low-pass filter and a voltage-controlled oscillator (VCO) that is connected downstream of the low-pass filter. The current-detector signal is detected by a current sensor in the primary coil circuit for the transformer.

The phase-locked loop ensures a continuous adjustment of the trigger signal generated by the control circuit for triggering the power-electronic switch. As a result of the delay element between output and input of the phase-locked loop, the signals for triggering the power-electronic switch, which are tapped directly at the output of the voltage-controlled oscillator for the phase-locked loop, ensure that these switches are always switched just before the zero passage of the switch current. The current inverter thus is ensured to operate inductively and a switching can be realized without loss. To achieve a switching without loss, the delay is adjusted such that the energy stored in the stray inductance at the moment of interrupting the current inverter is high enough to completely recharge the parasitic capacitances of the power-electronic switch. Following this, the current runs freely over the antiparallel diode of the newly closed transistor and the voltage over this transistor is clamped to the diode flux voltage. As a result, the respective switch can be closed without losses. The switches are subsequently triggered with complementary signals, meaning signals offset by 180°, wherein short-circuits in the current inverter are avoided as a result of the lag time between the edges of the trigger-signals for the power-electronic switches, so that the desired complete recharging of the transistor capacitances is possible.

The adjustment of the upper and lower edge frequency of the voltage-controlled oscillator in the phase-locked loop preferably occurs in such a way that with a suitable lower edge frequency, the triangular current course present during the excitation phase does not exceed a maximum current value. The upper edge frequency is selected such that the clocking frequency of the current inverter is always higher than the characteristic frequency of the current inverter, which is predetermined by the stray inductance of the transformer and the capacitors that are parallel connected to the output rectifier.

As previously explained in the above, several transformers in the high-voltage transformer arrangement according to the invention can preferably be provided with separate current inverters. Modules can thus be formed, which respectively consist of a current inverter, a transformer primary system, a transformer secondary system, an output rectifier and an output filter, preferably comprising a smoothing choke and a capacitor.

Especially when using several modules of this type, the components for the secondary parts can be dimensioned for smaller voltages. The individual modules can respectively be operated and tested separately and individual modules can be replaced.

According to one special embodiment of the invention, which is particularly suitable for the modular transformer design, several (N) current inverters are cyclically clocked with the same frequency, but with offset phase angle relative to each other. In particular, a phase angle of 360°/N is provided between the individual reversing operations of the current inverters.

Several identical modules of this type are preferably operated in the stationary mode and with the same clocking frequency, wherein the phase position of the trigger signals for the current inverters of the individual modules is fixed on the basis of the operation of a single module. The primary transformer current course of a single module determines the operation of the remaining transformers (master-slave principle).

Through a cyclical clocking of several current inverters with signals having the same frequency, but offset phase angles, the rippling (ripple) of the current for the intermediate-circuit capacitor and thus also the thermal stress of the capacitors in the intermediate circuit can be reduced. The cyclical switching through of the individual current inverter operations can be realized with the aid of the above-mentioned master-slave principle by connecting a logic circuit to the output of a phase-locked loop, preferably via a frequency divider. By using a suitable logic circuit of the type of a ring counter, trigger signals that are staggered in time are generated for the individual (N) current inverters. With each current inverter, the output signals and the complementary output signals of the phase-locked loop are used as trigger signals, that is to say during half a period duration of a cycle (output signal) or a complementary half period of a cycle (complementary output signal). Attention must be paid to the fact that the signals belonging to a transformer or a current inverter do not overlap.

The above-mentioned frequency divider, in particular, operates with a division ratio TV=2*N (N represents the number of transformers or current inverters that are interconnected to form a module), wherein a decimal ring counter is connected downstream of the frequency divider. The decimal ring counter counts from zero to 2*N−1 and is provided with a separate output for each state.

For example, with N=5 transformers and current inverters, ten outputs of the decimal ring counter are connected in pairs to a total of five RS flip-flops, wherein each flip-flop delivers at its output or its complementary output a trigger signal or drive signal or a complementary trigger signal or drive signal for an associated current inverter.

To ensure that all transformer sections have the desired potential, cores made from core materials with poor electrical conductivity, e.g. ferrite, must be provided with a conducting layer that should not, however, encompass the magnetic flux.

This conductive layer usefully is designed so as to permit a good insulation relative to the associated coil (primary coil or secondary coil). The conducting layers functioning as potential control electrodes or, with core materials having high conductivity, the individual core sections are electrically coupled to each other via impedances and connected to the desired electrical reference potentials. This measure permits an easy adjustment of the desired potential ratios, meaning the lowest possible maximum potential difference is achieved between the potentials for one coil and the potential of the associated transformer core section.

The conductive layer on the transformer core sections can be used advantageously for adjusting the desired potential ratios without using additional elements for the potential control. To do so, several transformers of a high-voltage transformer arrangement are arranged in such a way that the desired potential ratios adjust themselves through the capacitive effect of the potential control electrodes.

Exemplary embodiments of the invention are explained in the following with further details and the aid of drawings, which show in.

Figure 2:
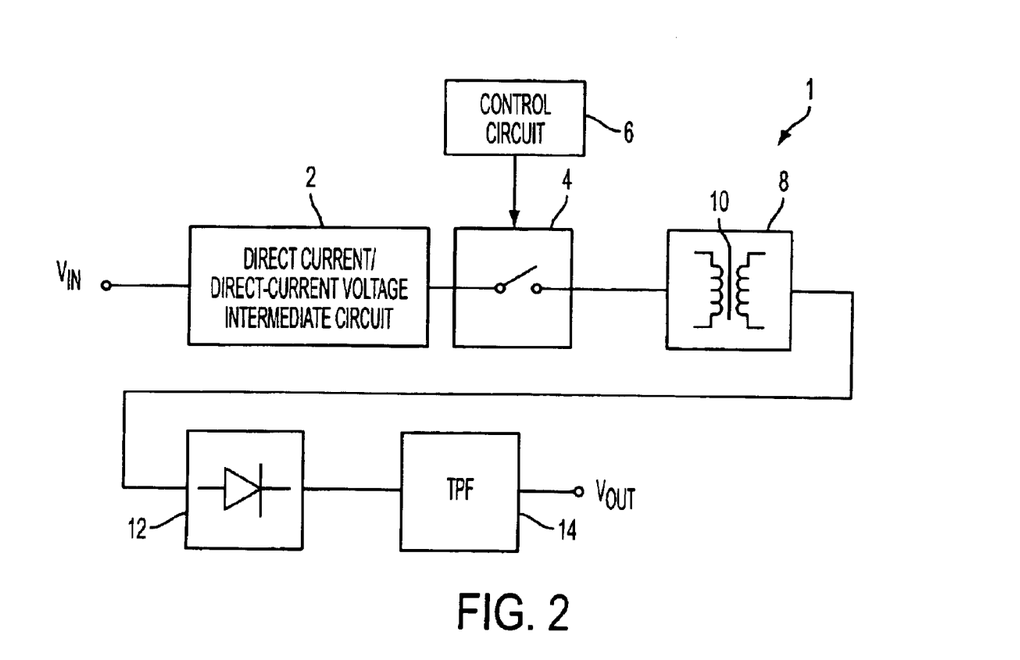
FIG. 2 A block diagram for an embodiment of a high-voltage transformer arrangement according to the invention.

Reference is made first of all to FIG. 2, which shows a high-voltage transformer arrangement according to a preferred embodiment of the invention in the form of a block diagram.

The high-voltage transformer arrangement generally given the reference 1 in FIG. 2 comprises a direct-current voltage intermediate circuit 2 as direct-current source, which is supplied on the input side directly with a direct-voltage signal or via a rectifier with an alternating voltage signal $V_{in}$ and which transmits a direct-voltage signal to a current inverter 4. This current inverter is shown symbolically as switch, but contains a plurality of power-electronic switches in practical operations. A control circuit 6 that is configured as switch control triggers the current inverter 4.

The current inverter 4 alternately switches the output signal from the direct-voltage intermediate circuit to a primary coil of a transformer 8. An output rectifier 12 is connected to the secondary side of the transformer 8, which is followed by a downstream-connected output filter in the form of a low-pass filter 14. The increased direct voltage $V_{out}$ may be tapped at the output of this low-pass filter.

Figure 1:
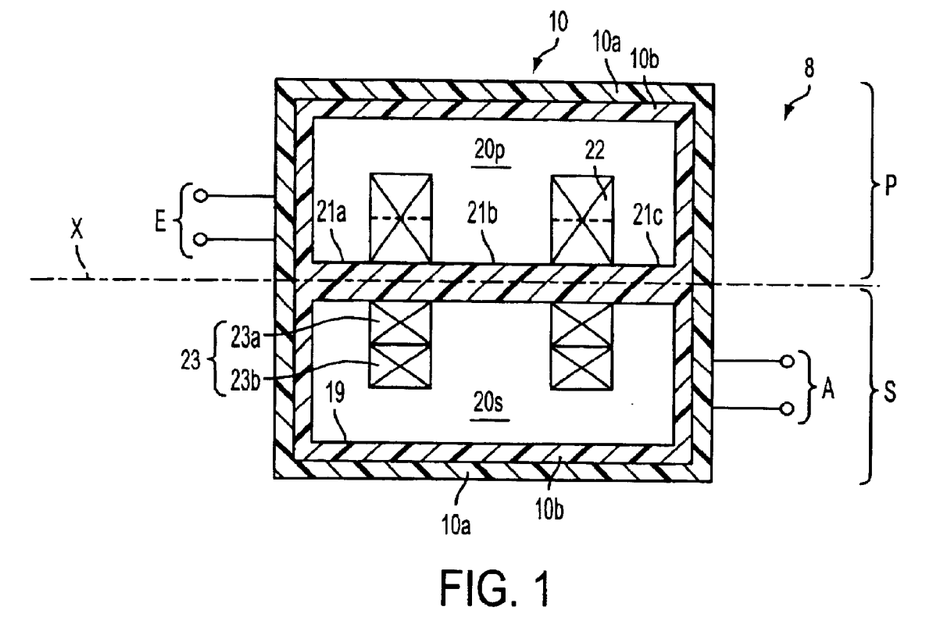
FIG. 1 A section through a transformer for a high-voltage transformer arrangement according to the invention.

The transformer 8 is shown in further detail in FIG. 1. The continuous insulator 10 in the transformer 8 in particular divides the transformer into a primary system P and a secondary system S that is electrically insulated from the primary system.

As shown in FIG. 1, the insulator 10 takes the form of a housing, consisting of the outside housing 10a of a mechanically stable material, e.g. a hard plastic, which surrounds the total transformer 8, and two separate inside parts 10b of the housing, made of a highly insulating material. The two inside housing parts 10b of insulator 10 define an imaginary separation line X for dividing the total transformer 8 into the primary system P and the secondary system S, to which voltage is supplied via an input terminal pair E or from which voltage is tapped via an output terminal pair A.

The primary system P comprises a transformer core section 20p and a primary coil 22.

The secondary system S comprises a secondary coil 23, consisting of two secondary coil sections 23a and 23b, on a secondary transformer core section 20s (a single continuous secondary coil 23 is possible as well).

An important element of the transformer 8 shown in FIG. 1 is the insulator 10, which divides the transformer spatially and electrically into the primary system P and the secondary system S. The special design of insulator 10 is not limited to the above-described embodiment. A totally different housing can also be provided or separate, individual insulator sections between the interruptions (21a, 21b and 21c), in the transformer core can also be provided for forming the sections 20p and 20s.

As a result of the electrical and spatial separation of transformer 8 with the aid of insulator 10, the stray inductance Lσ of transformer 8 is increased and its main inductance L (Lp, Ls) is decreased.

The advantages, explained in further detail in the above, of a spatial and electrical separation or insulation of primary system P and secondary system S are made clearer with the following detailed description of exemplary embodiments. As a result of the spatial separation, the insulation between the individual coils or coil sections and the transformer core sections can be realized more easily than with standard transformers. A favorable potential control is achieved at the individual transformer locations through a suitable wiring, which is explained further in the following. This potential control brings the maximum possible potential differences to values, which permit a simplified insulation between coil and transformer core.

Figure 3:
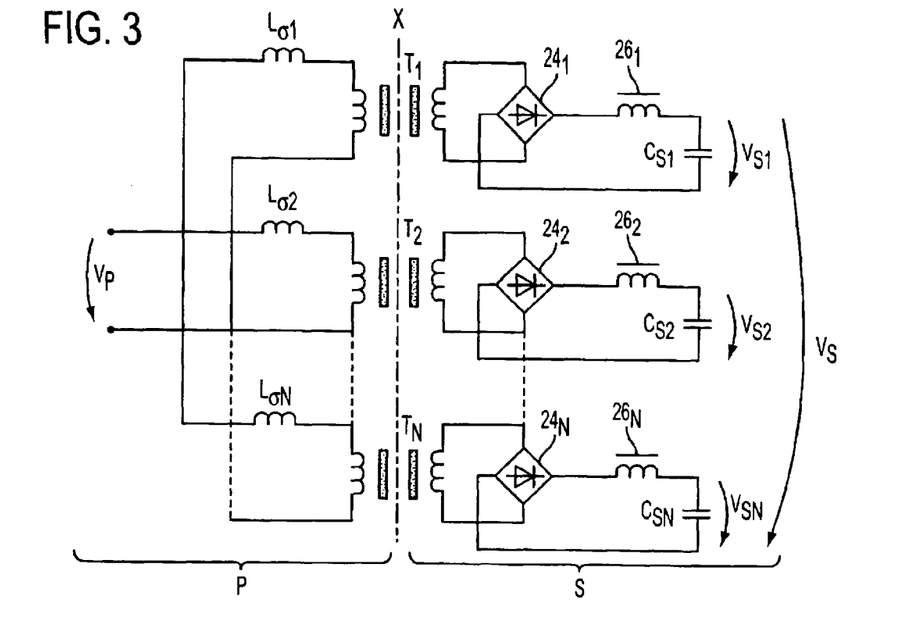
FIG. 3 A circuit diagram for a possible configuration of an interconnection of N transformers for a high-voltage transformer arrangement according to the invention.

First of all, we want to look at the high-voltage transformer arrangement shown in FIG. 3, wherein the current inverter 4 and the control circuit 6 on the primary side were omitted. Possible embodiments for the current inverter supplying the primary voltage $V_p$ follow from the description below.

According to FIG. 3, N separate transformers with a design as shown in FIG. 1 are provided. The individual transformers are given the references T1, T2, . . . TN. The primary coils for transformers T1 to TN are parallel connected and respectively receive the primary alternating voltage $V_p$.

The secondary coils for the individual transformers T1 to TN are individually connected to a Graetz bridge, wherein each Graetz bridge $24_1$, $24_2$ . . . $24_N$ transmits a rectified voltage via an output choke $26_1$ . . . $26_N$ to an associated output capacitor Cs1, Cs2, . . . CsN. The individual capacitor voltages Vs1, Vs2, . . . VsN add up to a total output voltage Vs.

Figure 4:
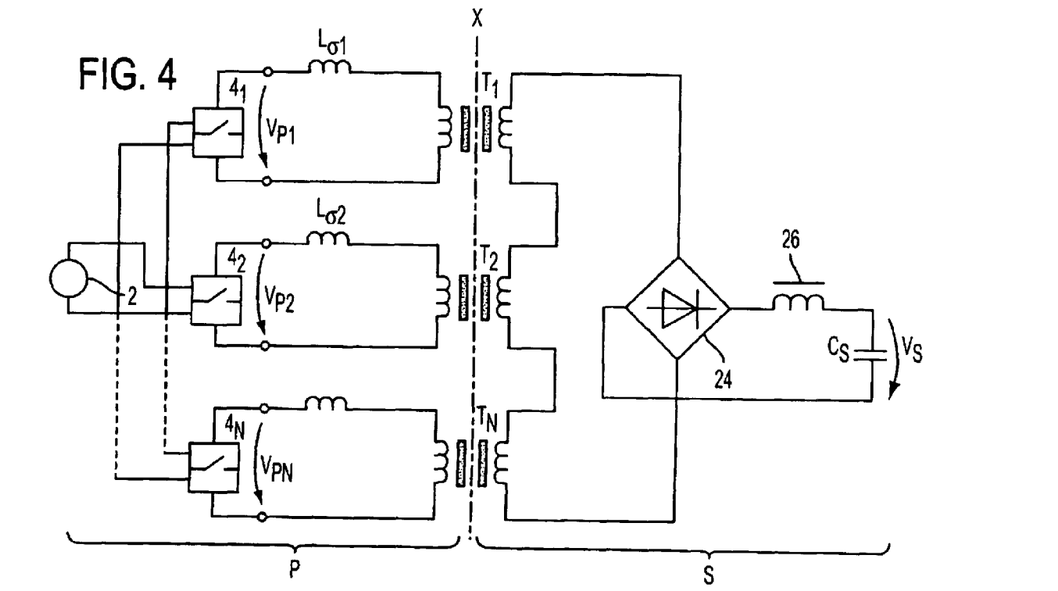
FIG. 4 A circuit diagram for an alternative embodiment of an interconnection of N transformers for a high-voltage transformer arrangement according to the invention.

FIG. 4 shows an alternative embodiment, for which the individual primary coils of N transformers T1, T2, . . . TN are respectively provided with a separate current inverter $4_1$, $4_2$ . . . $4_N$.

On the secondary side, the individual secondary coils are series connected. The sum of the secondary voltages is transmitted from a Graetz bridge 24, via a choke coil 26, to a capacitor $C_s$.

Figure 5:
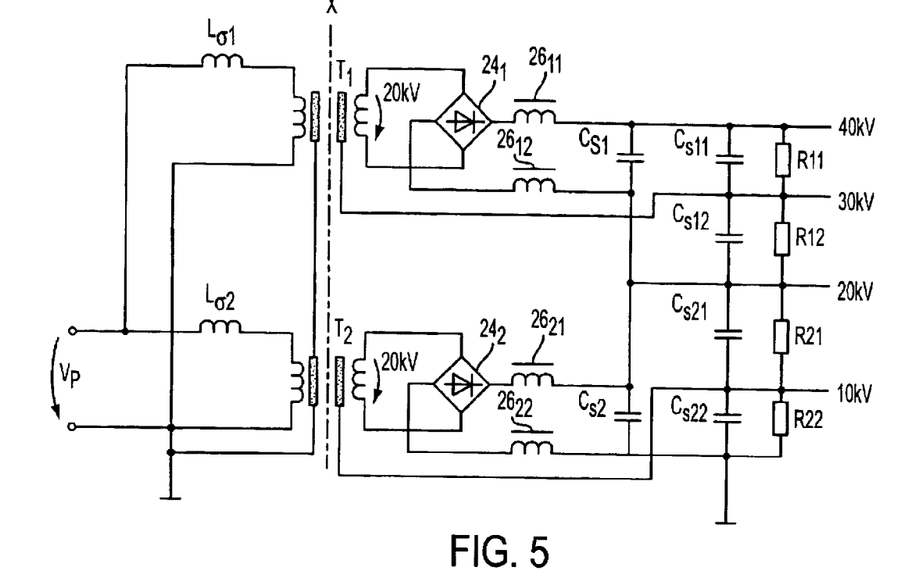
FIG. 5 A circuit diagram of another alternative interconnection of two transformers for a high-voltage transformer arrangement according to the invention, provided with a voltage divider for the potential control and a choke coil in each output branch of the output rectifier.

FIG. 5 shows a portion of a high-voltage transformer arrangement with two transformers T1 and T2, for which the primary coils are parallel connected and the secondary coils are respectively connected to a Graetz bridge. The rectified voltage of each Graetz bridge $24_1$, $24_2$ is supplied via storage choke coils $26_{11}$, $26_{12}$, $26_{21}$, $26_{22}$ to a pair of capacitors Cs11, Cs12 or Cs21, Cs22 with the same values, wherein a resistor R11, R12 or R21, R22 with the same value is parallel-connected to each capacitor.

The voltage divider, comprising the capacitors Cs11 to Cs22 and the resistors R11 to R22, provides respectively one fourth of the output voltage from tap to tap. The potentials are connected to corresponding core sections on the secondary side of the divided transformers.

For example, the voltage at each of the secondary coils for the two transistors T1 and T2 is 20 kV in this case. Relative to ground or mass, a potential of 40 kV therefore is present on the upper capacitor Cs11 surface, a potential of 30 kV on the upper capacitor Cs12 surface, a potential of 20 kV on the upper capacitor Cs21 surface and a potential of 10 kV between the capacitors Cs21 and Cs22.

The secondary-side core section of transformer 1 is connected to 30 kV while the secondary-side core section of transformer 2 is connected to 10 kV. As a result, the insulation between the coil and the associated core section for each of the transformers must only be designed for a maximum of 10 kV. In contrast, the insulation for the transformer T1 without complete division between primary and secondary side and complete ground connection of the core, as realized in FIG. 5 only for the primary side, would have to withstand 40 kV.

Figure 6:
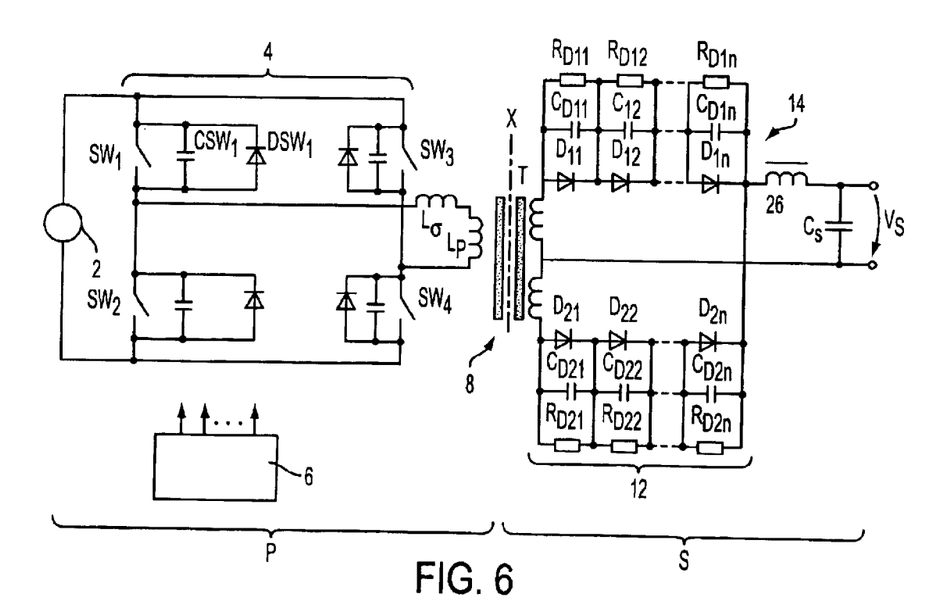
FIG. 6 A circuit diagram of a high-voltage transformer arrangement, comprising a transformer and the components that determine the characteristic frequency of the power circuit.

FIG. 6 shows the high-voltage transformer arrangement 1, schematically shown in FIG. 2, with further details. The current inverter 4 that is connected to the direct-voltage source 2 in this case comprises a total of four transistor switches, which can consist of individual transistors, parallel-connected transistors or transistor modules. These are shown symbolically and are given the references SW1, SW2, SW3 and SW4. A parasitic capacitance is associated with each transistor switch SW1 . . . SW4, which is shown in FIG. 6 on the left top with CSW1, parallel to the switch SW1. A diode DSW1 is furthermore connected parallel to the capacitance CSW1. In addition to the parasitic capacitance, a discrete capacitance can also be present, which is parallel connected to the parasitic capacitance. As a simplification, only one capacitor CSW1 is shown for the switch SW1 in FIG. 6. The same conditions as for switch SW1 also exist for the remaining switches SW2, SW3 and SW4.

The transformer 8 has a main inductance Lp on the primary side and $L_{s1}$ and $L_{s2}$ on the secondary side, as well as a stray inductance Lσ, wherein Lσ in turn has primary and secondary components.

On the secondary side, the two inductances formed with the secondary coil connections 22a and 22b are provided with a center tap, wherein this transformer represents an additional embodiment.

The secondary system S contains the secondary coils 22a and 22b with the associated inductances Ls1 or Ls2, the output rectifier 12 and the low-pass filter, connected thereto, with choke coil 26 and output capacitor Cd. The output rectifier in each branch of the secondary coil section in this case comprises a series-connection of diodes D11, D12 . . . D1N in the upper branch or D21, D22 . . . D2N in the lower branch.

Respectively one capacitor and one resistor $C_{D11}$ . . . or $R_{11}$ . . . is parallel connected to each diode.

The series-connection of the diodes serves to increase the voltage sustaining capability in the output rectifier 12. The parallel-connection consisting of capacitance and resistance for each diode serves the purpose of making the diodes symmetric with respect to the voltage to be blocked. Furthermore, the capacitors together with the stray inductance of the transformer form a series resonant circuit, which causes a sinusoidal transformer current starting with a specific output voltage.

The control circuit 6 in FIG. 6 is shown schematically as a block. Details of the control circuit 6 are explained further in the text below, in connection with FIGS. 7 and 8. The embodiment of the control circuit 6 itself is possible for the person skilled in the art because of the person's general knowledge. However, the aspects explained in the following must be taken into consideration for the special course of operation.

In the secondary system S shown in FIG. 6, current flows via the diode branch D11 . . . D1N or D21 . . . D2N into the output capacitor Cs, meaning alternating. That is to say, respectively one diode branch is conducting and the other one blocks, and vice versa. By means of the blocked diode branch with parallel-connected capacitors, a nearly sinusoidal negative voltage builds up, wherein a displacement current flows through the capacitors. Once this displacement current through the capacitors $C_{D11}$ . . . $C_{D1n}$ or $C_{D21}$ . . . $C_{D2n}$ has reached an intensity to match the intensity of the current flowing in the output capacitor Cs, the current flow through the previously conducting diodes of the other diode branch then reaches zero. A sinusoidal, negative voltage then builds up above this diode branch, which is now blocking. The voltage above the first blocked diode branch then reaches positive values and is clamped to the flux voltage of this branch, wherein the current simultaneously commutates from the capacitor branch to the parallel and previously blocked diode branch.

The sum of diode current and capacitor current corresponds to the course of the primary side transformer current—taking into consideration the transformation ratio of the transformer—and thus also in section-wise to the switch current.

If the high-voltage transformer arrangement according to FIG. 6 is operated with constant output voltage, a suitable dimensioning of the components will achieve that sinusoidal transformer currents are always flowing in the stationary mode of operation.

The energy stored in the stray inductance Lσ brings about in the current inverter 4 for the high-voltage transformer arrangement shown in FIG. 6 that the energy stored in the stray inductance during each operational step causes a charging and discharging of the capacitances CSW1 . . . of the transistor switches SW1 to SW4.

A complete recharging operation occurs if, during the switching off operation, the energy stored in the stray inductance Lσ is higher than the energy stored in the capacitances. That is to say, the capacitance belonging to the transistor to be opened is charged and the capacitance belonging to the transistor to be closed is discharged. Following this discharging operation, the voltage present at this transistor is clamped to the value of the forward voltage for the antiparallel-switched diode. The switching on subsequently occur at a voltage of nearly zero and almost without loss.

The current-carrying transistors must be opened sufficiently prior to the zero passage of the current, or the stray inductance must be increased, so that the energy stored in the stray inductance Lσ is high enough. Under some circumstances, the use of an additional inductance should also be considered. Also following from this is the requirement that the characteristic frequency of the resonant circuit formed by the capacitances of the output rectifiers 12 and the stray inductance must be lower than the clocking frequency for triggering the switches SW1-SW4 in the current inverter 4.

With a suitable triggering of current inverter 4 and matching dimensions for the components in the primary system P and the secondary system S, the circuit shown in FIG. 6 can be operated in the quasi resonant operation that ensures a switching without losses.

Figure 7:
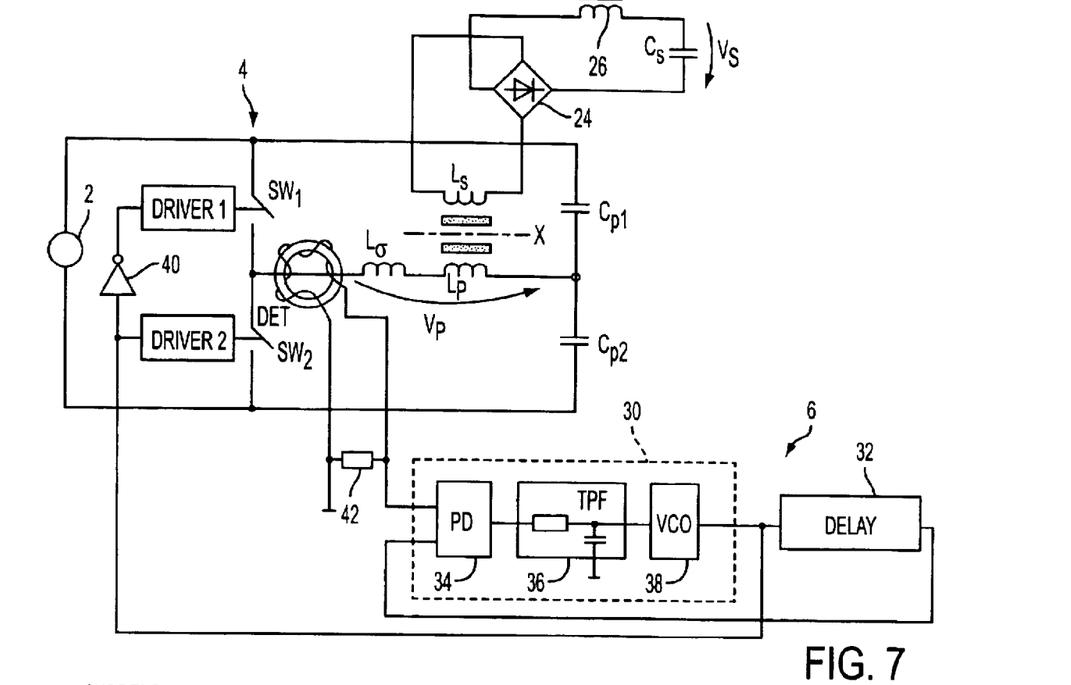
FIG. 7 A circuit diagram of a high-voltage transformer arrangement with phase-locked loop for triggering the current inverter of the high-voltage transformer arrangement.

FIG. 7 shows an embodiment of a high-voltage transformer arrangement consisting of one transformer. The main inductance Lp, Ls and the stray inductance Lσ of this transformer are shown. Also shown are the two transistor switches SW1 and SW2 with associated driver (driver 1, driver 2) of the current inverter 4. The secondary system consists of one Graetz bridge 24, a choke coil 26 and an output capacitor Cs.

The primary coil is connected with one terminal to the center tap of a half bridge formed by the two switches SW1 and SW2 and with the other terminal to the center tap for two capacitors Cp1 and Cp2. The switches SW1 and SW2 are transistor switches that do not block in reverse direction, such as the ones shown in FIG. 6 for the current inverter 4.

The control circuit 6 for triggering the current inverter 4 (shown here in a form that is modified from the one shown in FIG. 6) is shown on the lower right side in FIG. 7. The control circuit 6 comprises a phase-locked loop 30 with downstream-connected delay element 32. The phase-locked loop 30 comprises a phase detector (PD) or phase comparator 34, which is known per se, to which a low-pass filter 36 (RC element) and a voltage-controlled oscillator (VCO) 38 are connected.

A current sensor DET detects the current flowing through the primary coil, which is converted to a voltage with the aid of a resistor 42. The voltage reaches the first (upper) input of the phase detector 34. The output signal from the delay element 32 is transmitted to its second input. The output signal from the VCO 38 is supplied to the driver 2 for activating the switch SW2. A negator 40 inverts the signal without overlap in the edge region. The inverted signal then travels to the driver 1 to control the switch SW1. The two signals, which are supplied via the driver to the switches SW1 and SW2 do not overlap in time, thus preventing a bridge short-circuit.

The circuit shown in FIG. 7 permits an exact detection of the zero passages of the current with the current sensor DET. The phase-locked loop 30 causes the switches SW1 and SW2 to open and close at the correct times, wherein the delay of the delay element 32 is adjusted such that the current inverter 4 switches before the zero passage of the current in the transformer primary coil. A switching frequency adjusts in the process, which is higher than the characteristic frequency of the resonant circuit formed by the transformer stray inductance and the capacitors of the output rectifier.

A suitable dimensioning of the VCO with lower and upper edge frequency makes it possible to limit the current in the starting phase to a maximum value or achieve that with increasing characteristic frequency, the control frequency or the clocking frequency of the current inverter is still higher than the characteristic frequency.

Since the switching of current inverter 4 is controlled with the signal from the output of the VCO 38, the reversal always occurs before the zero passage. Thus, the current inverter always operates inductively and the switching can be realized without loss, provided the delay in the delay element 32 is adjusted as explained in the above.

Figure 8:
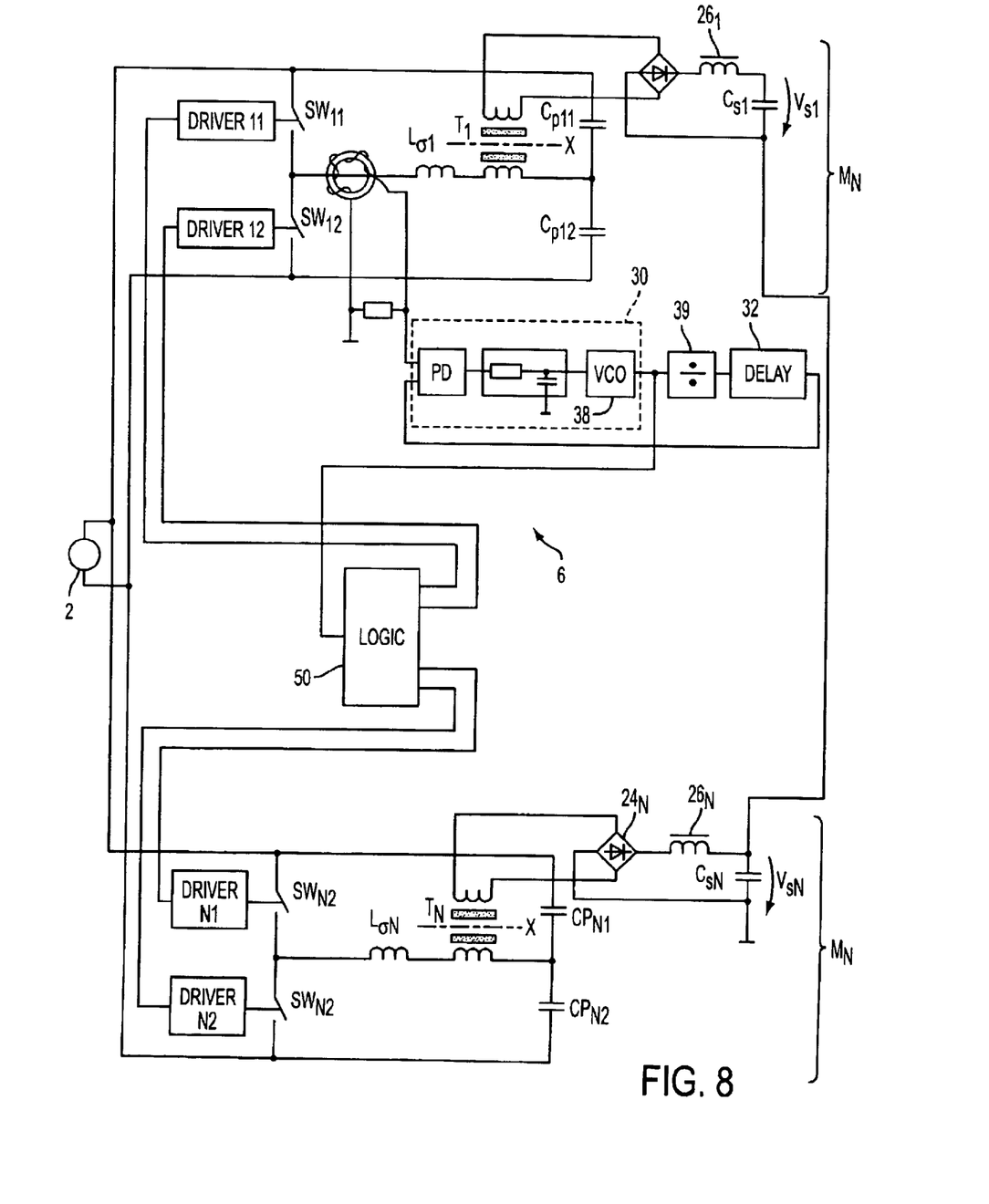
FIG. 8 A circuit diagram of a high-voltage transformer arrangement with N modules and a master-slave trigger logic for the separate current inverters of the individual N modules.

FIG. 8 shows a high-voltage transformer arrangement, comprising several (N) modules, wherein each module has a similar design as the circuit shown in FIG. 7. However, only a single control unit 6 is provided for all modules 1 ... N. Each module has a transformer T of a similar type as the one shown in FIG. 1 and is provided with a separate current inverter and a separate secondary system. The output capacitors Cs are connected in series, so that the resulting total output voltage corresponds to the sum of the individual capacitor voltages Vs1 ... VsN.

The upper part of the circuit shown in FIG. 8 resembles the circuit according to FIG. 7, except that a frequency divider 39 in the phase-locked loop is connected downstream of the VCO 38. The VCO supplies the frequency divider 39 with a relatively high output frequency, which is higher by the divisional factor TF than the characteristic frequency and is cophasal. Thus, the lock-in frequency of the phase-locked loop 30 is relatively low as compared to the output frequency from the VCO 38.

The relatively high output frequency from the VCO 38 is fed to a logic circuit 50. The logic circuit 50, comprising a ring counter and shown in further detail in FIG. 9, supplies trigger signals or complementary trigger signals to N pairs of outputs for the drivers 1.1, 1.2 or 2.1, 2.2 ... N.1, N.2 of the N transformers 1 to N. Thus, the current inverters 4 of all transformers T1 to T5 are switched with the same frequency, but cyclically displaced in phase,, such that the reversal occurs with a phase difference of 360°/N.

The high-voltage transformer arrangement shown in FIG. 8 is therefore controlled by the control circuit 6 on the basis of the master-slave principle.

Figure 9:
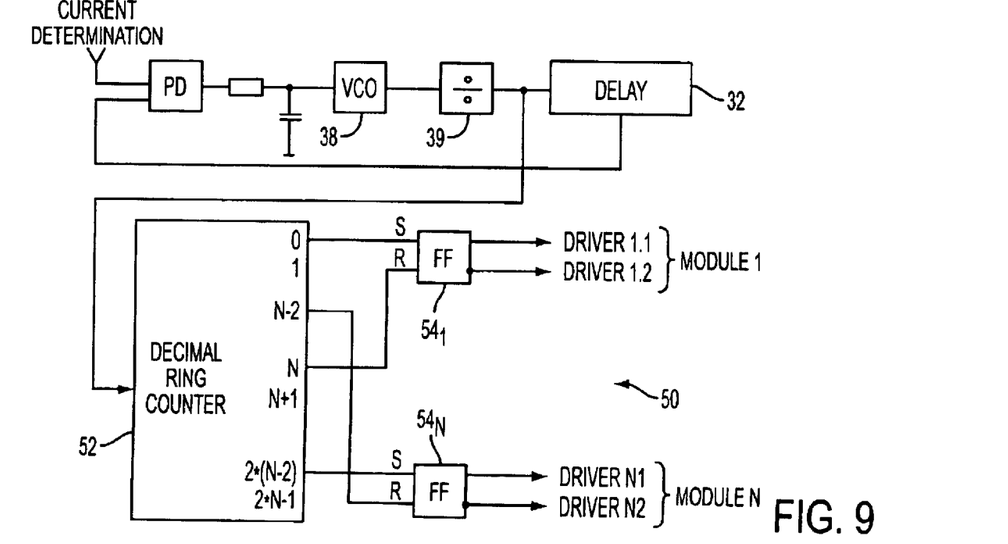
FIG. 9 A detailed circuit diagram of the logic for generating trigger signals, which is shown in the center of FIG. 8.

FIG. 9 shows the logic circuit 50 in further detail. The output signal from the frequency divider 39 is transmitted to an input of a decimal ring counter 52, which has 2*N outputs, here numbered 0, 1, 2, ... N−2 ... N, N+1, ..., 2*N−1.

From the output pairs (0, N), (1, N+1) ... lines lead to the set input or the reset input of respectively one RS flip-flop $54_1 \ldots 54_N$, the output or complementary output of which supplies the trigger signals for the drivers in modules 1 to N.

Figure 10:
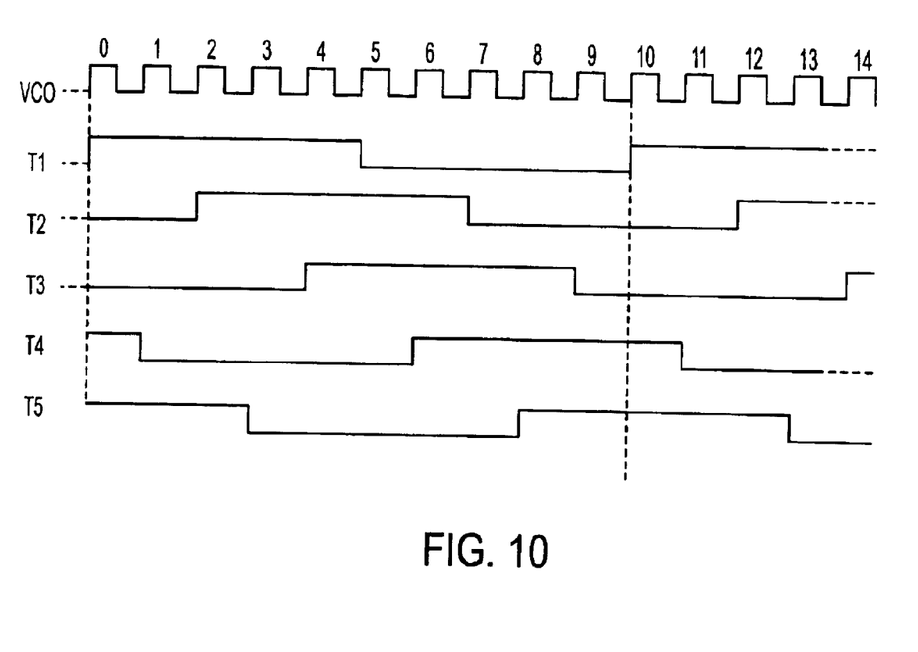
FIG. 10 A pulse diagram for explaining the operation of the circuit according to FIG. 9.

With the aid of a pulse diagram, FIG. 10 shows the driver signals for the current inverters in transformers T1 to T5. The complementary driver signals are not shown, but their course can be seen in the circuit shown in FIG. 9. Over a total of ten output clocking cycles of the VCO, the switch pair SW1, SW2 of each module 1–5 (=N) is switched on and off once.

What is claimed is:

1. A high-voltage transformer arrangement, comprising
   a direct voltage source;
   at least one current inverter with power-electronic switches;
   at least one transformer having
   i) at least one primary coil,
   ii) at least one secondary coil, and
   iii) one transformer core;
   a switch control for triggering the current inverter, such that the direct voltage source is alternately connected on the primary side to the at least one transformer;
   at least one output rectifier, which is connected to the at least one secondary coil, and
   at least one filter that is connected to the output rectifier;
   wherein
   the transformer core has several interruption points on the magnetic path where insulation sections are located, and that the sections formed by the interruptions in the transformer core together with the associated coils or coil sections of primary and secondary coils, form primary and secondary systems that are separated with respect to potential,
   and further wherein the energy is transmitted without buffer storage in the transformer from the primary to the secondary system, based on the flux converter principle, and that at least one storage choke coil with adjoining output capacitor is assigned to the output rectifier.

2. A high-voltage transformer arrangement according to claim 1, wherein a continuous insulator is arranged between the primary and the secondary system.

3. A high-voltage transformer arrangement according to claim 1, wherein the direct-voltage source is formed by a direct-current voltage intermediate circuit, connected via a rectifier to an alternating voltage source.

4. A high-voltage transformer arrangement according to claim 1, comprising several secondary coils, wherein the secondary coils have a center tap and the output rectifier is designed as center-tap connection.

5. A high-voltage transformer arrangement according to claim 1 comprising several secondary coils, wherein the secondary coils are not provided with a center tap and the output rectifier is designed as a Graetz bridge.

6. A high-voltage transformer arrangement according to claim 1, wherein the transformer or the interconnected transformers are connected on the primary side with one terminal to the center tap of a half bridge, consisting of power-electronic switches that do not block in reverse direction, and with the other terminal to a capacitor.

7. A high-voltage transformer arrangement according to claim 1, wherein the transformer or the interconnected transformers are connected on the primary side with each terminal to the center tap of respectively one half bridge, consisting of power-electronic switches, which do not block in reverse direction.

8. A high-voltage transformer arrangement according to claim 1, wherein during the switching operation, the stray inductance of the transformer is used together with the parasitic capacitances of the power-electronic switch and, if necessary, capacitances that are additionally parallel connected to these switches for a resonant operation.

9. A high-voltage transformer arrangement according to claim 1, wherein in order to increase the voltage sustaining capability in each branch of each output rectifier, several diodes are connected in series.

10. A high-voltage transformer arrangement according to claim 1, wherein a capacitance and a resistance with the same values are parallel connected to each output rectifier diode in order to balance the diodes with respect to the voltage to be blocked.

11. A high-voltage transformer arrangement according to claim 1, wherein the stray inductance of the transformer together with the capacitances of the output rectifier form a series resonant circuit, which is attuned such that its characteristic frequency is somewhat lower than the clocking frequency of the high-voltage transformer arrangement.

12. A high-voltage transformer arrangement according to claim 1, comprising several primary coils within a transformer, wherein the primary coils are connected parallel or in series and also include one or several secondary coils.

13. A high-voltage transformer arrangement according to claim 1, comprising several secondary coils within a transformer, wherein the secondary coils are connected parallel or in series, wherein several secondary coils enclose one or several primary coils.

14. A high-voltage transformer arrangement according to claim 1, wherein the insulator sections are composed of one or several different materials.

15. A high-voltage transformer arrangement according to claim 1, wherein the insulator sections represent components of a housing that encloses the primary system (P) and/or the secondary system.

16. A high-voltage transformer arrangement according to claim 14, wherein the regions belonging to the primary system and the secondary system are separated by a wall and that the individual regions are filled, independent of each other, with an insulating gas, an insulating liquid or an insulating solid material, in particular a powder.

17. A high-voltage transformer arrangement according to claim 1, wherein the control circuit is provided with a phase-locked loop, the first input of which is supplied with a current detector signal derived from the chronological course of the primary transformer current while the second input of which is supplied with the output signal of the phase-locked loop via a delay element and that the power-electronic switches are triggered with the output signal and the complementary output signal of the phase-locked loop.

18. A high-voltage transformer arrangement according to claim 1, wherein several transformers are connected parallel on the primary side and in series on the secondary side.

19. A high-voltage transformer arrangement according to claim 1, wherein several transformers are parallel-connected on the primary side and that on the secondary side of each transformer a separate rectifier with respectively associated smoothing choke and respectively associated output capacitor is provided, wherein the output capacitors are connected in series.

20. A high-voltage transformer arrangement according to claim 1, wherein each transformer is provided on the primary side with a separate current inverter, which is connected to a joint voltage source, so that individual modules are formed, which respectively consist of a current inverter, a transformer, an output rectifier, a smoothing choke and an output capacitor.

21. A high-voltage transformer arrangement according to claim 20, wherein the several (N) current inverters are cyclically clocked with the same frequency, but offset by a predetermined phase angle.

22. A high-voltage transformer arrangement according to claim 21, for which the phase angles for N current inverters are offset by 360°/N relative to each other.

23. A high-voltage transformer arrangement according to claim 21, wherein the clocking frequency and the phase position of the trigger signals for all modules are derived from the course of the primary transformer current of one module.

24. A high-voltage transformer arrangement according to claim 23, wherein the control circuit is provided with a phase-locked loop with voltage-controlled oscillator on the output side, wherein the phase-locked loop has a downstream-connected delay element and a frequency divider is positioned between the phase-locked loop and the delay element, and wherein phase offset trigger signals for the several (N) current inverters are derived from the output signal of the phase-locked loop.

25. A high-voltage transformer arrangement according to claim 24, wherein a decimal ring counter is connected downstream of the frequency divider, which counts from zero to 2*N−1 and has a separate output for each state, wherein pairs of the decimal ring counter outputs are respectively conducted to an RS flip-flop belonging to respectively one module, the outputs of which supply the trigger signals for the individual modules.

26. A high-voltage transformer arrangement according to claim 1, wherein the individual sections of the transformer core are electrically connected to reference potentials and via impedances.

27. A high-voltage transformer arrangement according to claim 1, wherein the transformer core sections are coated with a conducting layer, which functions in the manner of potential control electrodes and is connected with reference potential and via impedances to other potential control electrodes, wherein the conducting layer does not encompass the magnetic flux.

28. A high-voltage transformer arrangement according to claim 27, wherein several transformers are arranged in such a way that the desired potential ratios adjust as a result of the capacitive effect of the potential control electrodes among each other.

* * * * *